Patented Nov. 5, 1929

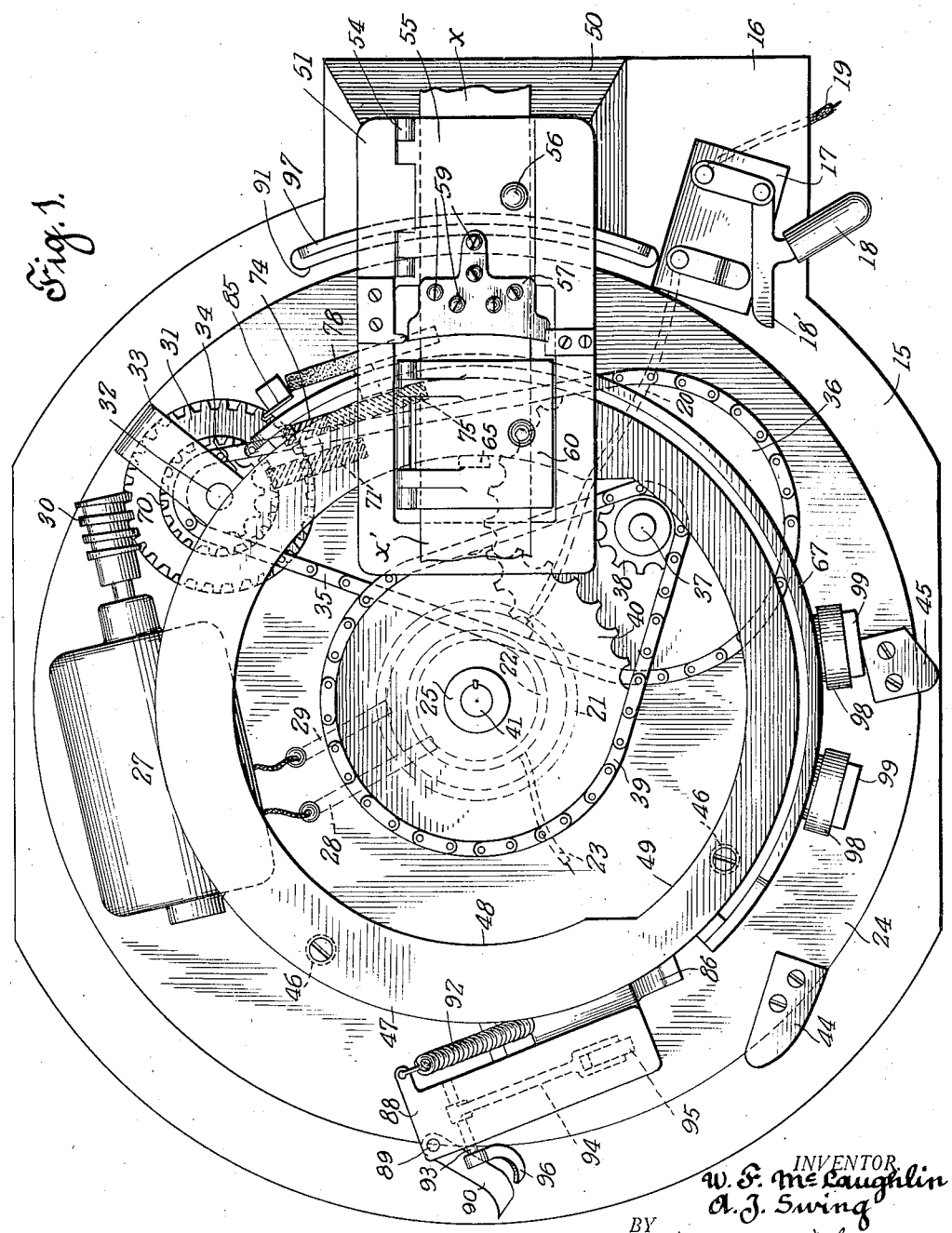

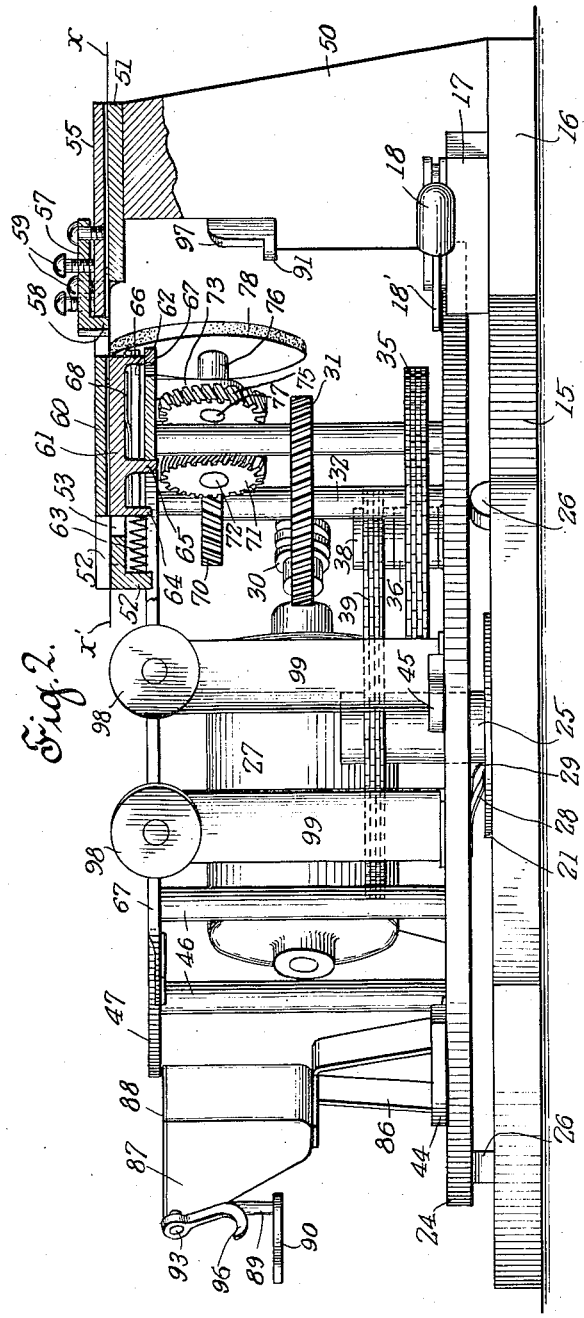
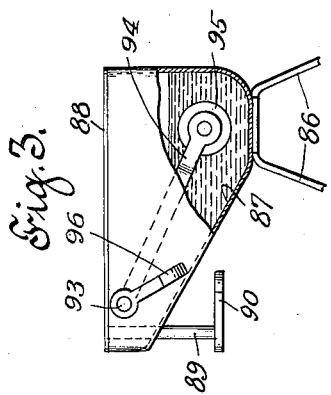

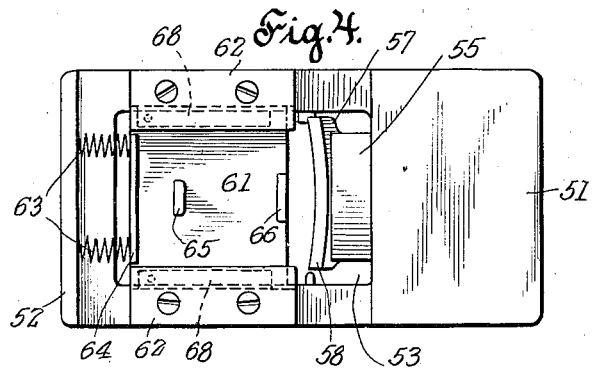
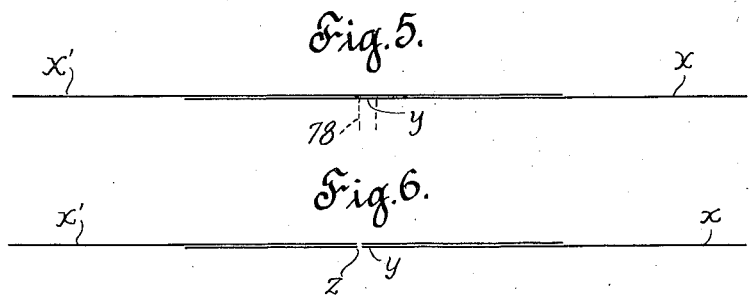
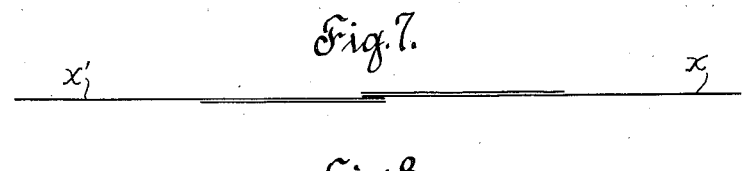
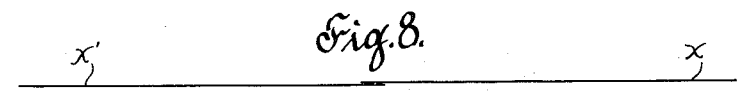
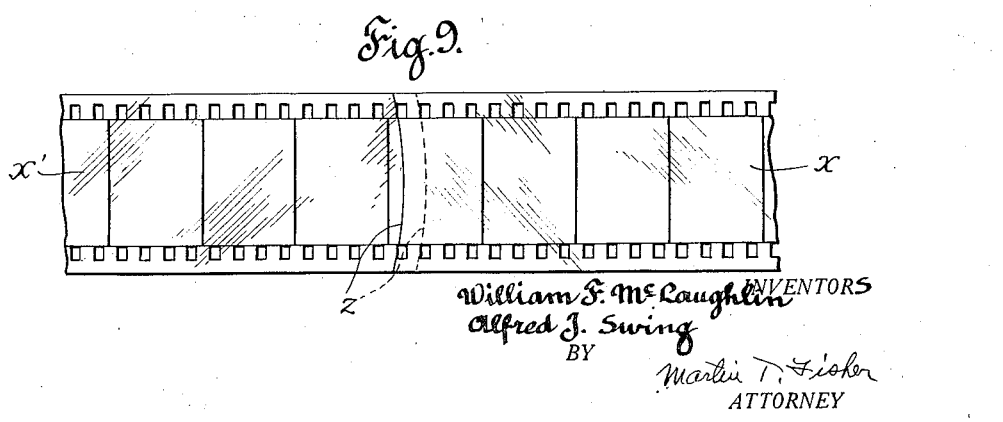

1,734,140

UNITED STATES PATENT OFFICE

WILLIAM F. McLAUGHLIN AND ALFRED J. SWING, OF BLOOMFIELD, NEW JERSEY, ASSIGNORS TO AUTOMATIC FILM MACHINE CORPORATION, OF NEW YORK, N. Y., A CORPORATION OF DELAWARE

FILM-SPLICING MACHINE

Application filed March 30, 1927. Serial No. 179,419.

This invention relates to film splicing machines as used in the moving picture industry where thin strips of celluloid or like material is employed as the medium for carrying a series of photographs.

Films of such fragile material frequently develop cracks and other defects resulting in fractures causing separation of the film and interruption in the continuity of picture projection.

Ordinarily the films are passed through testing apparatus at each run so that defects may be cured prior to their further projection, but in any case the remedy must be easy and quick to apply as well as efficient in operation.

Commonly one or more of the pictures containing the defect are cut out and a lap joint made with cement at the cut ends, care being taken to maintain correct spacing between contiguous pictures and the perforations at the edges of the film.

It is one object of the present invention to provide a machine of substantially automatic character by which, upon entering the portion of the film to be spliced and closing a switch, will consecutively remove the emulsion at the proper place, cut the overlapped ends of the film, apply a suitable adhesive, move the cut ends into adjusted relation, apply pressure to the joint thus newly formed and stop, whereupon the spliced film is removed.

We are aware of the various patents which have issued on devices of this nature but show herein a novel construction in which the operating devices move in a rotary path and thereby avoid the jars and strains of a reciprocally moving structure and also attain a curved or arcuate line of jointure where the spliced ends of the film meet.

A further feature is in the provision of means for forming an improved joint at the lapped ends having unusual strength and less perceptibility than ordinary.

These and other important advantages which will become evident as the description progresses, are attained by the novel construction and combination of parts hereinafter described and shown in the annexed dawings, forming a material part of this disclosure, and in which:

Fig. 1 is a top plan view of a complete embodiment of the invention.

Fig. 2 is a partly side elevational, partly sectional view of the same.

Fig. 3 is a side elevational view of the adhesive reservoir and submerged dauber, parts being broken away to show the interior.

Fig. 4 is a bottom plan view of the film end supports.

Figs. 5 to 8 inclusive are edge views of the progressive stages of a film being spliced.

Fig. 9 is a plan view of a film fragment.

The apparatus as shown consists of a flat cylindrical base 15 with oppositely flattened sides and an extension 16 on which is mounted an electric switch 17 provided with a hand lever control 18, the switch being connected with a source of electrical energy by the conductor 19.

Another conductor 20 from the switch leads to a plate ring 21 raised and insulated from the flat base 15 at its center, and a smaller ring 22, concentric therein, has a conductor 23 leading to a ground or return current wire.

A disc turntable 24 is revolubly mounted on an upright sleeve 25 axially of the base, the disc resting on rolls 26 journalled in the base, and carried on the turntable is an electric motor 27 having spring contacts 28 and 29 resting respectively on the rings 21 and 22 by which current is conveyed to the motor when the switch 17 is closed.

On the motor spindle is fixed a worm 30 meshed with a gear 31 fast on a vertical spindle 32 having its respective ends journalled in the turntable 24 and a bracket 33 upstanding from the turntable near its periphery.

Secured on the spindle 32, at its lower end, is a pinion 34 to drive a chain 35 trained over a sprocket wheel 36 fixed on a stub shaft 37 rotatably mounted in the turntable 24, and carrying a pinion 38 driving a chain 39 trained over a sprocket 40 fixed to the sleeve 25, this sleeve being keyed to a fixed stud 41 set in the base 15.

From the foregoing it will be understood that when the switch 17 is closed the turntable 24 will be rotated by the motor, which is carried by it, and at a speed reduced from the motor in proportion to the gear train just described.

In order to cause cessation of rotation of the turntable a cam 44 is fixed on the face of the turntable 24 adapted to strike the switch lever end portion 18' to open the switch, and at another point rearward of the cam 44 is another cam 45, the purpose of which will later appear.

Set in the turntable 24 are a series of upright studs 46 carrying at their upper ends a circular plate ring 47, at a height to clear the motor as best seen in Fig. 2, this ring presenting a concentric cam surface 48 of a definite radius throughout the greater part of its inner circumference and a smaller portion 49 of a greater radius.

Fixed on the base projection 16 is an upright 50 having secured on its level upper surface a plate 51 reaching radially inward to pass over the cam ring 47, the plate at its inner end being provided with a transverse depending ledge 52, and containing a rectangular opening 53.

Attached on the outer portion of the plate 51 by hinges 54 is a cover 55 provided with a knob 56 for convenience in raising, and having on its upper surface an adjustable guard 57 provided with an arcuate ledge 58 extending through the opening 53, this guard being adjusted by a series of screws 59, three of which are used to draw the guard towards the cover and three to raise it therefrom for a purpose described hereinafter.

A similar cover 60 is attached by like hinges to a slide 61 movable longitudinally in the opening 53 and supported by cleats 62 secured to the underside of the plate 51.

The slide 61 and its cover is pressed normally outward by a pair of compression springs 63 respectively abutting the ledge 52 and a corresponding down-turned flange 64 on the rear edge of the slide which is caused to move by reason of a lug 65, on the bottom of the slide, engaging the inner cam faces 48 and 49 of the ring 47.

Another lug 66 on the front of the slide 61 is engageable with a segmental cam 67 carried by the ring 47 at a spaced distance from its periphery for a portion of its edge surface, the lug and cam acting co-operatively to bring the slide into a horizontal position, its normal position being inclined slightly downward by reason of flat springs 68 on which the slide is rockingly mounted, the springs resting directly on the cleats 62, except as held up by the cam 67.

Returning to the vertical spindle 32, a helical gear 70 is fixed on its upper portion to engage a corresponding gear 71 fixed on a short horizontal stub shaft 72 mounted in a bracket 73 depending from the ring 47 and on the shaft 72 is fixed a pinion 74 driving a gear 75 secured on a spindle 76 at its inner extending end 77 also journalled in the bracket 73 and having on its outer end an abrading wheel 78, such as carborundum, the peripheral edge of which is in a plane level with the top of the plate 51, and due to the train of gears recited it will be seen that the wheel 78 is driven at a high speed.

The film strip ends "X" and "X¹" are placed on the plate 51 and slide 61, under the covers 55 and 60, the slide 61 being held retracted inwardly by the lug 65 and cam 48, permitting the abrading wheel 78 to scarify the under surface of the superposed film ends, as at "Y", Fig. 5, during the movement of the wheel past the film, cleaning off the surface as it advances in an arcuate path, the film being adjustably held rigid by the ledge 58 opposed to the wheel.

Rearward and following the path of the abrading wheel 78 is a knife 85 separating the doubled ends of the film, as at "Z", Fig. 6, by an arcuate cut.

Immediately after cutting the superposed ends, an adhesive is applied to the bared spot "Y" in the following manner.

Fixed on the turntable 24, at a point nearly opposite the abrading wheel 78 is a bracket 86 supporting a tank 87 having an inclined bottom and provided with a cover 88 pivoted on a post 89 passing perpendicularly through the shallow end of the tank at its outer corner, the lower end of the post having a fixed lever 90 to engage an arcuate cam 91 carried on the inner side of the upright 50.

The result of such engagement is obviously to swing the tank cover 88 from over the tank, the cover being returned by a tension spring 92 connecting between a fixed part of the bracket 86 and a lug extending from the cover opposite its pivotal point.

Passing transversely through the narrow portion of the tank is a spindle 93 to which is fixed an arm 94 terminating in a fork, between the elements of which is pivoted a dauber roll 95 movable by gravity into the deeper portion of the tank and submerged in the adhesive therein.

Fixed to the outer extending end of the spindle 93 is a curved arm 96 adapted to engage a cam 97 adjacently above the cover opening cam 91, and by which the dauber is brought into contact with the cleaned end portion of the film to deposit a coating of adhesive thereon.

After applying the adhesive the parts return to their normal condition and continued movement of the turntables causes the lug 65 to move from the cam 48 to the cam 49, the springs 63 moving the slide 61 outwardly and at the same time tilting its outer end, together with the film end carried by it, slightly downwardly permitting the end "X¹" to pass under the end "X" as shown in Fig. 7.

The next operation is to press the cemented and overlapped arcuately cut edges firmly together to cause coherence, this being accomplished by the united effect of a pair of rolls 98 freely rotatable on pivot studs carried at the upper ends of supports 99 fixed on the turntable 24, these rolls pressing the joint against the film under the slide 61 when in its outermost position.

At that time the release cam stop 44 throws open the switch 17, which may thereafter be closed by hand, restarting the apparatus to be eventually stopped by the cam element 45 at a convenient point to remove the mended film and replace it with another requiring similar treatment.

It is to be noted that the operation of the apparatus is continuous, acting in sequence to clean the film, cut out imperfections, apply an adhesive, move the cut ends into superposed relation and press the joint during the time to set the adhesive, this last operation being practically doubled in effect due to the two rolls, and finally to restore the parts into receptive position.

Although I have described my improvements with considerable detail and with respect to certain particular forms of my invention, I do not desire to be limited to such details since many changes and modifications may well be made without departing from the spirit and scope of my invention in its broadest aspect.

Having thus described my invention, what I claim as new and desire to secure by Letters Patent, is:

1. A film splicing apparatus comprising a base, a turntable rotatable on said base, a motor on said turntable to cause rotation thereof, a fixed film holder, and means actuated by said motor for performing the following consecutive operations on the film; abrading a transverse strip on the film, cutting transversely at one edge of the strip, applying an adhesive, positioning the cut ends in superposed relation, and forcing the offset edges into coherence.

2. In a film splicing apparatus, a film holding table comprising a plate, a slide, hinged covers for said plate and said slide, means to impel said slide toward said plate, a cam to normally retract said slide against the action of said impelling means and a turntable, turnable on a vertical axis, on which said cam is mounted.

3. In a film splicing apparatus, a film holding table comprising a plate, a slide, hinged covers for said plate and slide, a pair of cleats, flat springs intermediate said cleats and said slide, resilient means to impel said slide toward said plate, a lug on said slide, a cam abutting said lug to draw said slide against the action of said resilient means and a turntable, turnable on a vertical axis, on which said cam is mounted.

4. In a film splicing apparatus, a film holding table having a slide, a lug on said slide, a turntable, means on said turntable to transversely cut the film, a cam engaging said lug to control the movement of said slide toward the fixed portion of said film table, and means associated with said film table to tilt said slide placing the cut edges of the film in superposed relation.

5. In a film splicing apparatus, the combination with a fixed film holding table, of a turntable, a motor on said turntable, a gear train, and an abrading wheel actuated by said train of gears to scarify the film.

6. In a film splicing apparatus, a film holding table, a turntable, a knife on said turntable to cut the film arcuately across, and means on said turntable to cause said cut edges to take a superposed position.

7. In a film splicing apparatus, a film holding table, a turntable disposed in a substantially horizontal plane and turnable on a vertical axis, a knife on said turntable to cut said film, means to apply an adhesive to the cut edges, means to place the edges of the film in superposed relation, and rolls on said turntable to press the superposed edges into coherence.

8. In a film splicing apparatus, a circular base having an extension, a turntable rotatable on said base on a vertical axis, film holding means for holding the two ends of the film just above the turntable, means on the turntable for cutting and cementing the film ends, a motor on said turntable, a switch on said base extension, and means on said turntable to open said switch when said turntable has made a revolution.

9. In a film splicing apparatus, a film holding member, a horizontally disposed turntable turnable on a vertical axis carrying cleaning, cutting, cementing and cohering elements, means for actuating the same in sequence to form a splice, and automatic stopping means to cause rotation to cease at a predetermined point, which point is at the end of one splice and at the beginning of another.

10. In a film splicing apparatus, film holding means comprising a plate and a slide, clamps cooperating with the plate and slide for holding the film ends, a turntable turnable on a vertical axis, below the film holding means, devices carried by the turntable for operating on the film held by the film holding means, cam means to normally move the slide away from the plate, and resilient means for moving the slide toward the plate to overlap the film ends.

In testimony whereof we have hereunto affixed our signatures.

WILLIAM F. McLAUGHLIN.
ALFRED J. SWING.